United States Patent
Przytulla et al.

(10) Patent No.: US 6,230,892 B1
(45) Date of Patent: May 15, 2001

(54) STACKABLE RE-USABLE CONTAINER

(75) Inventors: Dietmar Przytulla, Kerpen; Khaled Atta, Erftstadt, both of (DE)

(73) Assignee: Mauser-Werke GmbH, Bruhl (DE)

( * ) Notice: Subject to any disclaimer, the term of this patent is extended or adjusted under 35 U.S.C. 154(b) by 0 days.

(21) Appl. No.: 09/555,011

(22) PCT Filed: Nov. 23, 1998

(86) PCT No.: PCT/EP98/07554

§ 371 Date: Sep. 13, 2000

§ 102(e) Date: Sep. 13, 2000

(87) PCT Pub. No.: WO99/26852

PCT Pub. Date: Jun. 3, 1999

(30) Foreign Application Priority Data

Nov. 25, 1997 (DE) .......................... 297 20 725 U
May 22, 1998 (DE) .......................... 298 09 094 U

(51) Int. Cl.⁷ .................................................. B65D 25/00
(52) U.S. Cl. ...................... 206/509; 206/508; 220/4.04; 220/4.27
(58) Field of Search ................................ 220/4.04, 4.05, 220/23.6, DIG. 1, 4.27; 206/508, 509

(56) References Cited

U.S. PATENT DOCUMENTS

| | | | |
|---|---|---|---|
| 3,780,899 | * 12/1973 | Roper | 220/4.04 |
| 4,311,238 | * 1/1982 | Smith | 206/508 |
| 4,369,598 | * 1/1983 | Beckwith | 220/4.27 X |
| 4,482,067 | * 11/1984 | Saito et al. | 206/509 X |
| 4,512,493 | * 4/1985 | Von Holdt | 206/508 X |
| 5,217,142 | 6/1993 | Schutz | 220/601 |
| 5,377,861 | * 1/1995 | Landis | 206/508 X |
| 5,469,985 | * 11/1995 | Furuichi et al. | 206/509 X |

FOREIGN PATENT DOCUMENTS

| | | |
|---|---|---|
| 1 918 548 | 10/1969 | (DE) . |
| 1 586 834 | 8/1970 | (DE) . |
| 94 08 722 | 11/1994 | (DE) . |
| 0 504 718 | 9/1992 | (EP) . |
| 0 673 841 | 9/1995 | (EP) . |
| 0 745 538 | 12/1996 | (EP) . |
| 2 385 594 | 10/1978 | (FR) . |
| 1 269 626 | 4/1972 | (GB) . |
| 2 137 158 | 10/1984 | (GB) . |

* cited by examiner

Primary Examiner—Steven Pollard
(74) Attorney, Agent, or Firm—Pennie & Edmonds LLP

(57) ABSTRACT

A reusable container, made of a thermoplastic material, with at least one filler and drain opening (18) in the top panel (20) and with a circumferential upper and lower stacking ring (12, 16). To permit reuse, direct stackability, good residual drainability as well as good manipulability of the container, this invention provides for the upper stacking ring (12) to have a slightly larger diameter than the lower stacking ring (16) and to feature on the inside of its upper rim a recess matching the diameter of the lower stacking ring (16) and on the outside a vertically protruding circular flange, so that, when stacked one container atop the other, the lower stacking ring of the upper container fits into the recess in the upper stacking ring of the barrel underneath and is snugly centered therein by the vertically protruding circular flange. This allows for the direct, multiple, secure stacking of the containers that are the object of this invention.

23 Claims, 11 Drawing Sheets

STACKABLE RE-USABLE CONTAINER

BACKGROUND OF THE INVENTION

This invention relates to a reusable container made of a thermoplastic material, with at least one filler and drain opening in the top panel or container lid, and with an upper and a lower circumferential stacking ring.

A similar thermoplastic container has been described for instance in DE-A 26 29 630. That earlier container, featuring thin extruded side walls, offers relatively poor stackability, its residual drainability is inadequate and it is not suitable for reuse.

SUMMARY OF THE INVENTION

It is the objective of this invention to eliminate such shortcomings by introducing a reusable container which is sturdy in design, permits direct multi-tiered stacking, offers good residual drainability and, in particular, allows for multiple use and facilitated manipulation. According to the invention, this is accomplished by means of the characteristic features specified in patent claim 1. By giving the upper stacking ring a slightly larger diameter than the lower stacking ring, providing a recess inside the top rim of the upper stacking ring which recess matches the diameter of the lower stacking ring, and incorporating on the outside a vertically protruding circular flange whereby, when stacked one container atop the other, the lower stacking ring of the upper container fits into the recess in the upper stacking ring of the container underneath and is snugly centered by the vertically protruding circular flange, it is possible for containers per this invention to be securely stacked in multiple tiers without requiring intermediate stacking pallets. Moreover, the larger diameter of the upper stacking ring facilitates the handling and manipulation of filled containers of this type. Various enhanced, advantageous design variations of this invention are specified in the subclaims.

The structural design of the container and the advantages it offers also make the container per this invention quite suitable for relatively hazardous liquids such as herbicides or pesticides, allowing multiple reuse. This novel reusable container may incorporate any of the following features and enhancements:

- The upper rim at the top end of the collar of the upper stacking ring has a solid square cross section from the outside of which the circular flange protrudes vertically in the axial direction;
- The collar of the upper stacking ring is slightly flared toward the outside;
- The center section of the container body is fully cylindrical over a certain axial length while its upper and lower sections respectively connecting to the upper and lower stacking ring are slightly rounded and tapered;
- The height (=axial length) of the rounded, tapered wall sections respectively connecting to the upper and lower stacking ring, i.e. to the respective collar to where the fully cylindrical section of the container wall begins, is approximately 110 mm (4.33");
- The maximum diameter of a manually manipulable i.e. portable container with a limited capacity of not more than 70 liters (18.5 gallons) is approximately 380 mm (15") in the area of the fully cylindrical container wall or the outer edge of the upper stacking ring;
- The top panel is essentially flat or slightly convex and is provided in the area of its flat perimeter with two mutually opposite, protruding bungs with gas-tight sealable bungholes;
- The essentially flat or slightly convex (domed) top panel connects via a flared or rounded circular section at the junction of the upper stacking ring to the tapered section of the lower container wall;
- The bottom panel is slightly sloped toward one side in such fashion that a depression (=trough) constituting a sump is formed underneath a drain bung;
- In the area of the sump, the bottom panel is provided with at least three protrusions, slightly pointing inwards, serving to center the bottom end of a pump tube (e.g. a Micromatic filler and drain suction tube);
- The center of the bottom panel is slightly convex or domed to facilitate residual drainage;
- The center of the top panel is slightly concave to facilitate residual draining of an inverted container;
- The container wall is a multilayered structure consisting of at least two or more different types of thermoplastic material (co-extrusion);
- The container has a limited capacity of about 70 liters (18.5 gallons) and is provided with at least two handles in the upper stacking ring, so that the container is still manually manipulable i.e. portable;
- A single, interchangeable-cavity blow mold according to this invention is capable, by inserting circular sections of different heights in the fully cylindrical part of the container wall, of producing containers of varying heights (same diameter, top and bottom panels) with a capacity for instance of 25 L, 30 L, 50 L, 60 L or 70 L (6.6, 7.9, 13.2, 15.9 or 18.5 gallons);
- The collar of the lower stabilizing ring above the angled circular foot is provided with perforations (e.g. drilled holes) allowing the circular foot of a stacked container to be fastened to the upper stacking ring of a container underneath it, in that suitable fastening aids (such as wire clips or plastic cable ties) can be inserted through a perforation and a handle opening;
- For fastening at least two side-by-side containers to one another, they are so positioned that their handle openings line up, permitting a length of a fastening aid (such as a clamping strap, a wooden lath or board) to be inserted through the handle openings for locking the containers together;
- For more secure stacking during storage or transport, several containers stacked on a pallet can be fastened to one another or to the pallet itself by means of fastening aids inserted through the handle openings in the upper stacking ring and/or through the perforations in the circular foot;

As a particularly salient feature of the new blow mold for producing a reusable container per this invention, the two blow-mold parts are each provided with an attachment serving to punch out the handle openings in the upper stacking ring.

The blow mold is designed as an interchangeable-cavity mold in which the mold parts for the fully cylindrical center section of the container are separated along a horizontal mold-parting plane permitting the production of different container sizes, having the same diameter but varying heights, by the simple process of exchanging and inserting the desired circular section. By inserting the desired circular center section it is thus possible to produce in one single blow mold different container sizes with capacities from 25 to 70 liters.

BRIEF DESCRIPTION OF THE DRAWINGS

The following explains and describes this invention in more detail with the aid of the design examples illustrated in the drawings in which.

DETAILED DESCRIPTION OF THE INVENTION

Figure 1:
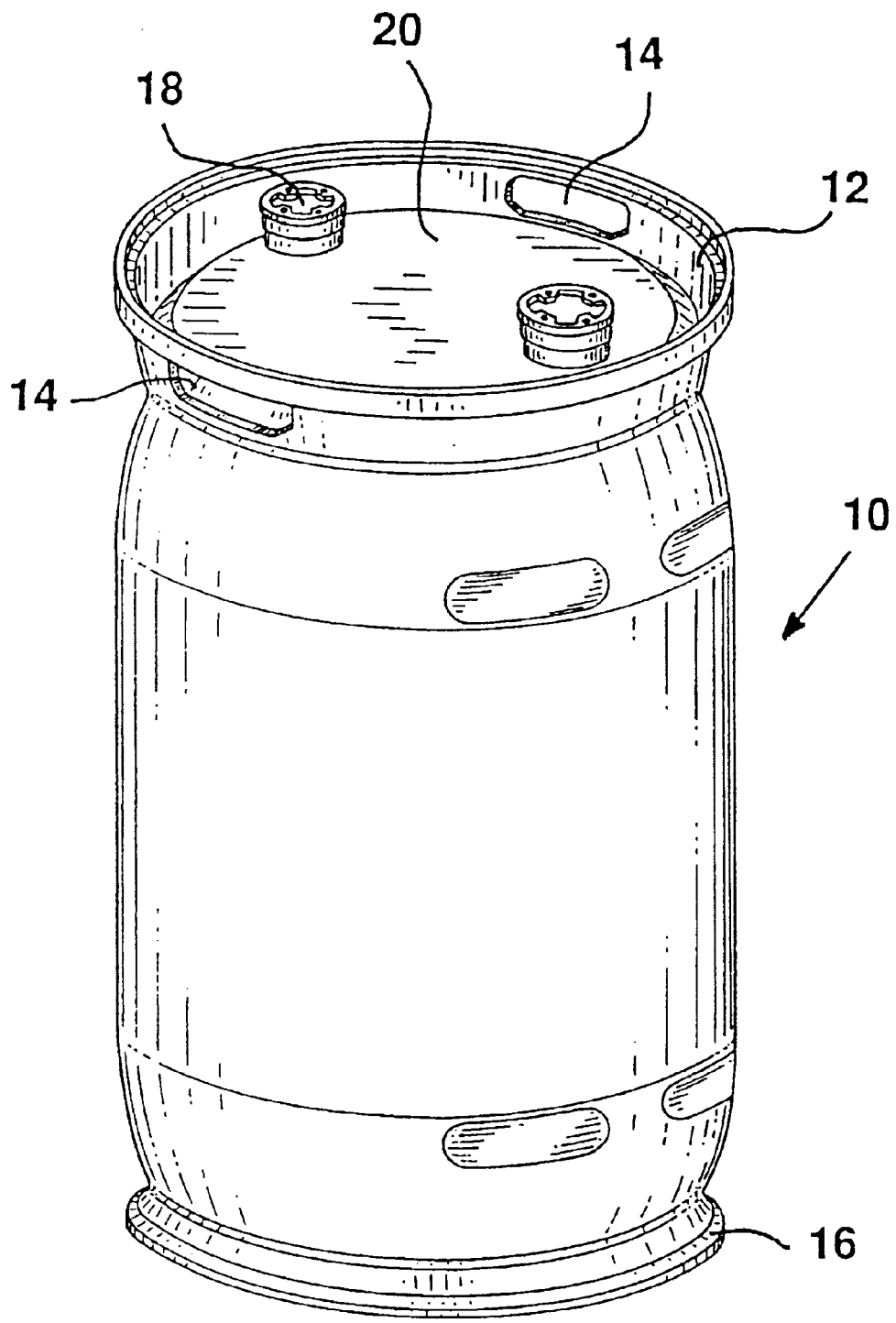
FIG. 1 is a perspective view of a 50-liter bung-type container according to this invention.

FIG. 1 shows a preferred design example of a reusable thermoplastic container 10 according to this invention, in this case with a capacity of 50 liters (13.2 gallons) and with a height/diameter ratio H/D of 1.60. The upper rim of the drum incorporates as an integral part a circumferential stacking ring 12 (handling and transport ring) with two diametrically opposite handle openings 14. The bottom rim of the container body is equipped with a corresponding support ring 16. Built into the top panel 20 are two mutually opposite, internally threaded 2-inch bung fittings sealed with bungs 18.

Figure 2:
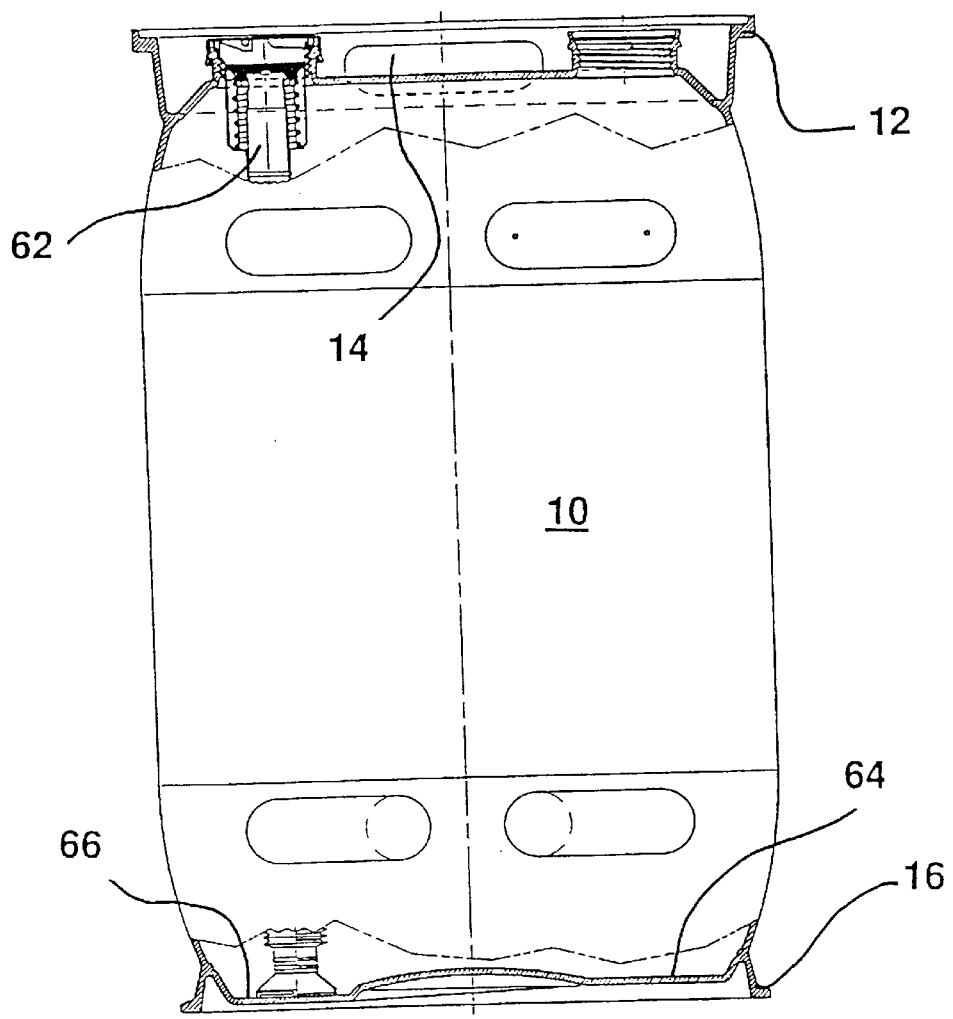
FIG. 2 is a partly sectional side view of the reusable container per FIG. 1, with a Micromatic pump tube inserted.
Figure 3:
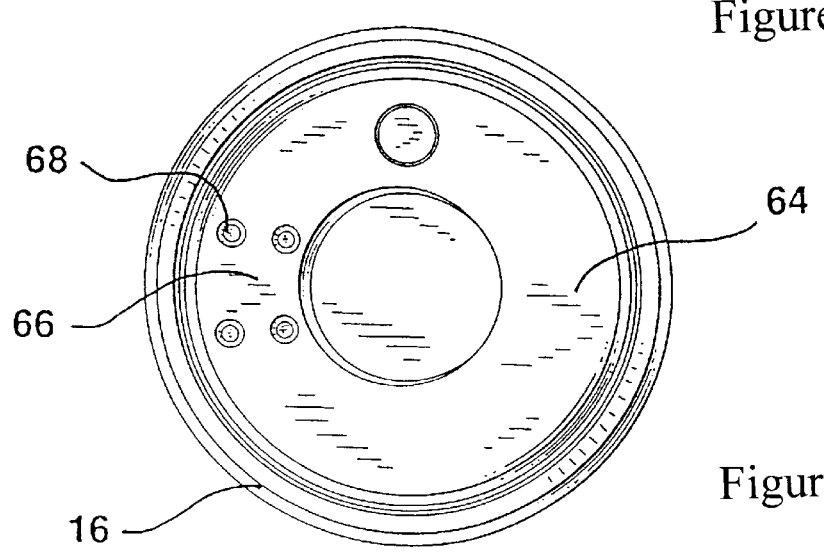
FIG. 3 is a bottom view of the reusable container per FIG. 1.

FIG. 2 is a partly sectional side view showing an inserted pump tube 62 (Micromatic tube) which extends all the way to the sump 66 on the bottom panel 64 underneath the bung. As can be seen in the illustration of the bottom panel 64 in FIG. 3, the sump area 66 is provided with four inward-protruding centering lugs 68 which center the lower end of the pump tube 62, holding it positioned in the sump.

Figure 4:
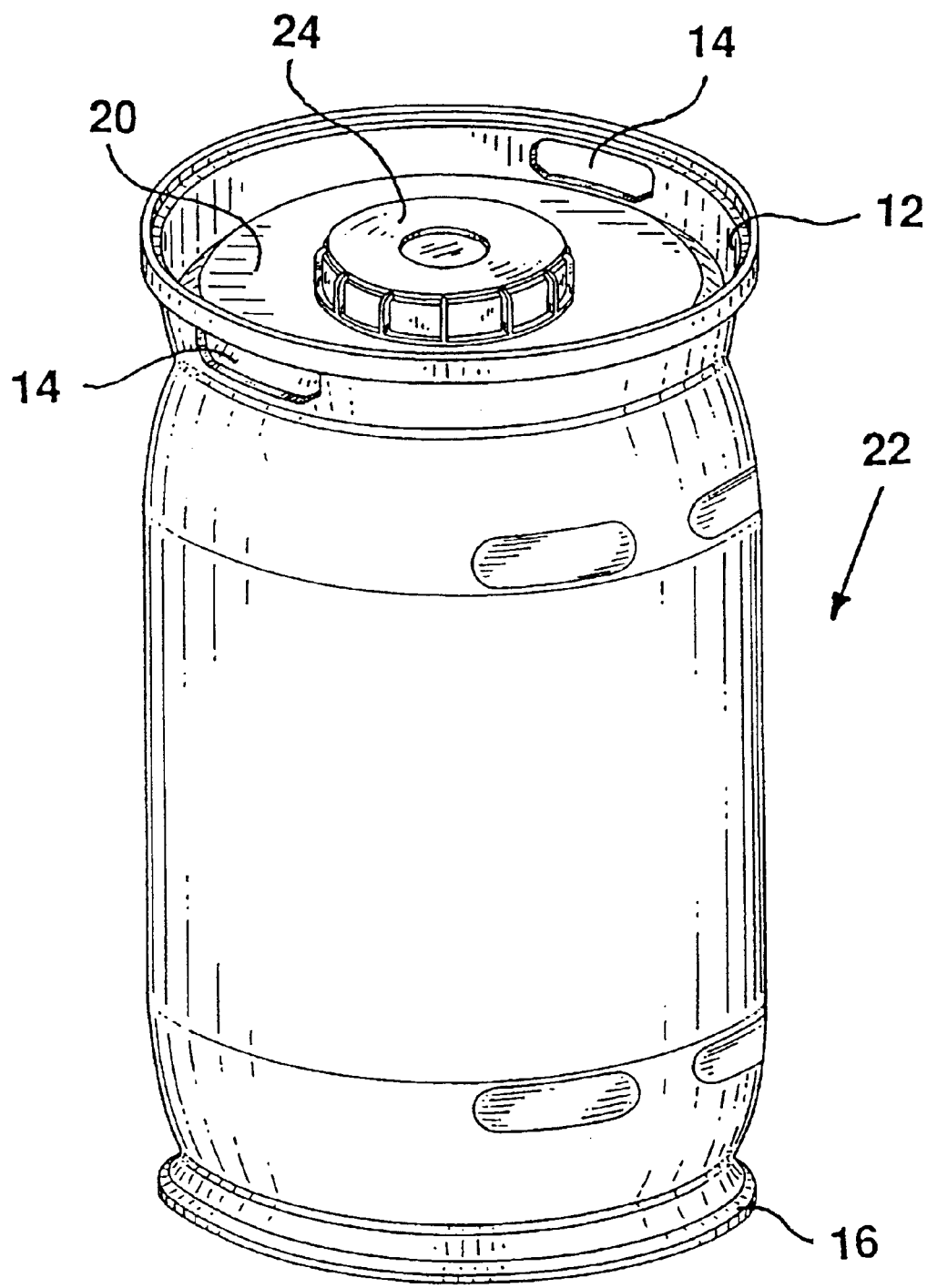
FIG. 4 is a perspective view of the container according to this invention with a screw-on lid.

FIG. 4 shows a desirable design variant of the reusable container in the form of a small screwlid-type barrel 22 with a capacity of 50 liters (H/D=1.60), in which case the top panel 20 is provided with only one large, central filler and drain opening which is closed with a threaded cap 24. The threaded protruding fitting may be a 2-inch or 3-inch bung fitting with an internal thread and a matching bung with a corresponding external thread, or the fitting has a male thread and is closed with an internal-thread screw-on cap. The diameter may be about 80 mm (3.15") (for a K 80 screw cap) up to 400 mm (15.75") for large screw lids. Particular preference is given to the popular sizes with a diameter of 150 mm (5.9"), 220 mm (8.65") or 250 mm (9.85").

Figure 5:
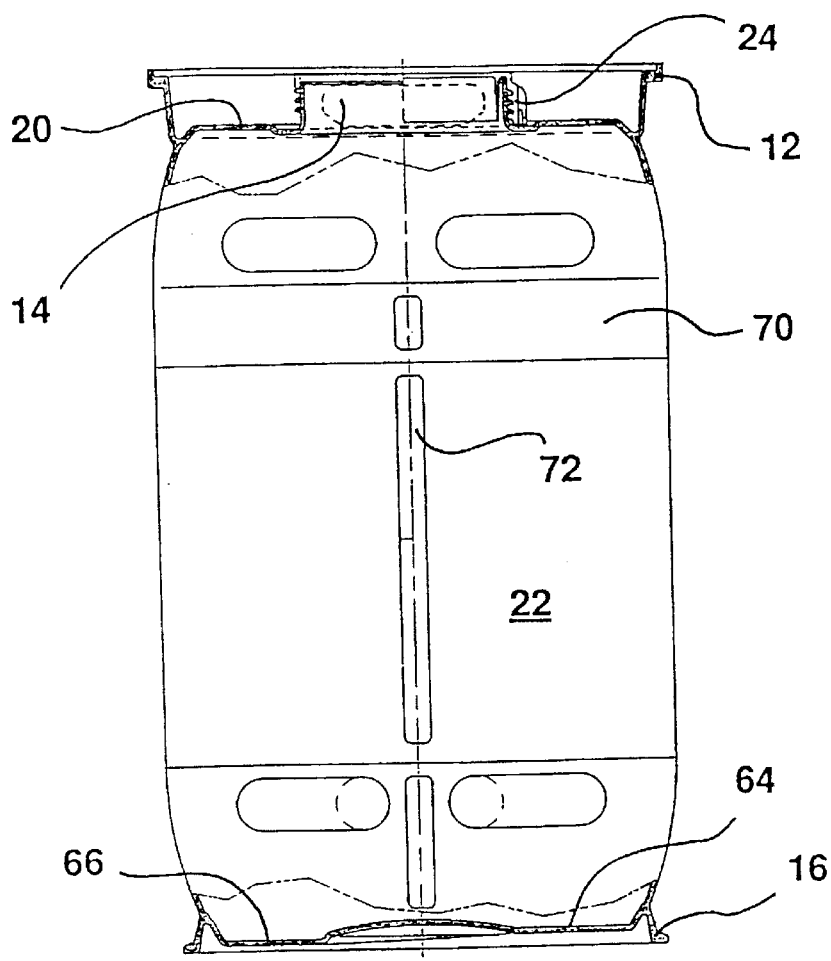
FIG. 5 is a partly sectional side view of a 60 liter screw-lid-type container.

FIG. 5 illustrates a 60 liter screw-lid-type container (approx. diameter 380 mm (15"), approx. height 685 mm (27"), H/D ratio 1.75) with an interpositioned circular adapter section 70. The reusable container may be produced from a transparent thermoplastic material (without the addition of any coloring) or, if opaque, with a transparent viewing strip 72, ideally with a fill-level scale molded into the outer container wall. Where necessary, two outward-protruding, circumferential rolling profiles may be provided in the transitional part between the cylindrical wall and the rounded, tapered wall sections.

Figure 6:
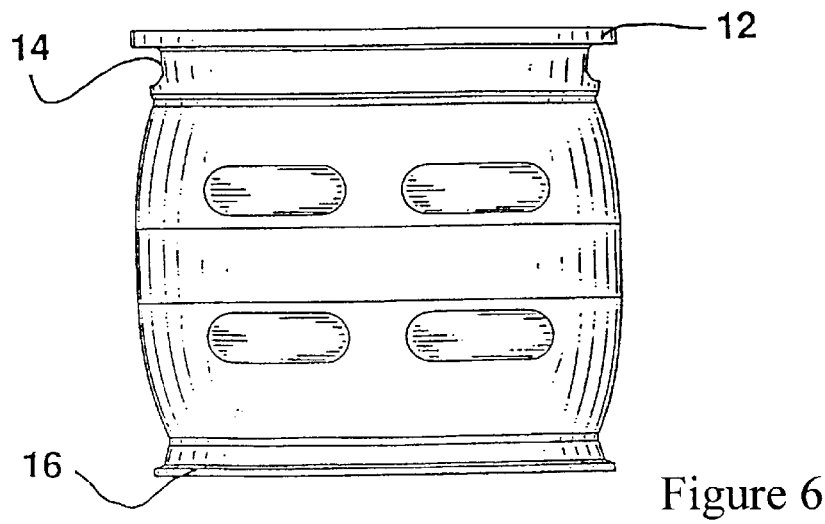
FIG. 6 is a side view of a reusable 25 liter container.

FIG. 6 depicts a small 25 liter reusable container with an H/D ratio of 0.97.

Figure 7:
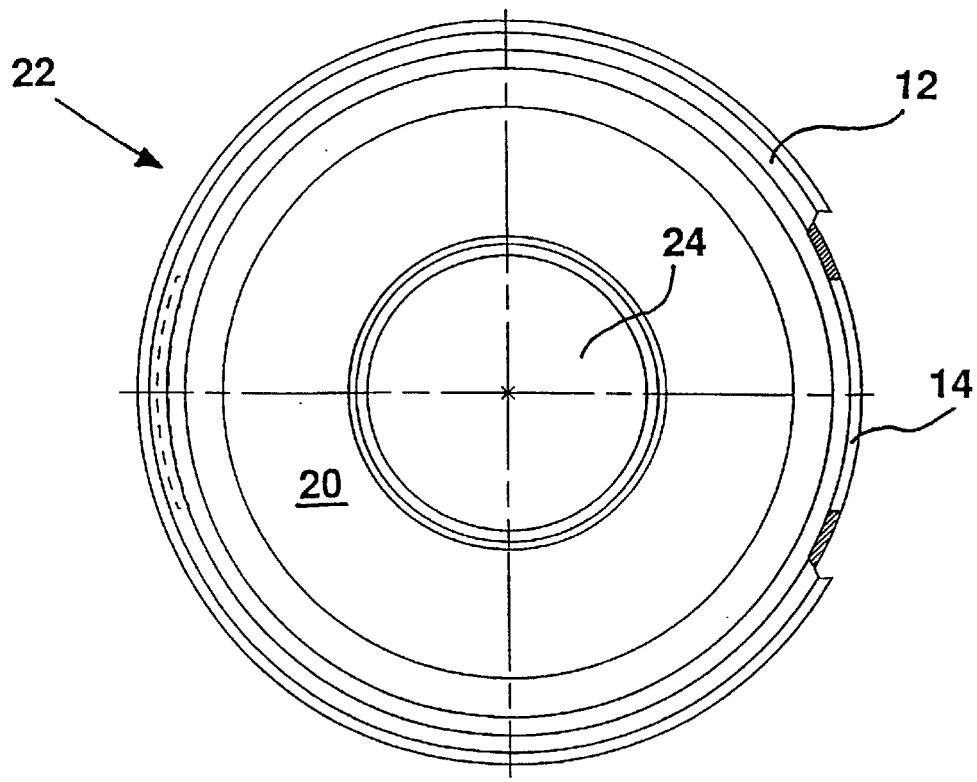
FIG. 7 is a top view of the screw-lid-type container per FIG. 4.

FIG. 7 is a top view of a screw-lid barrel 22 with one central filler and drain opening for the large screw lid 24, while the upper stacking ring 12 is perforated in the area of the right-hand handle opening, as shown in the partial sectional illustration.

Figure 8:
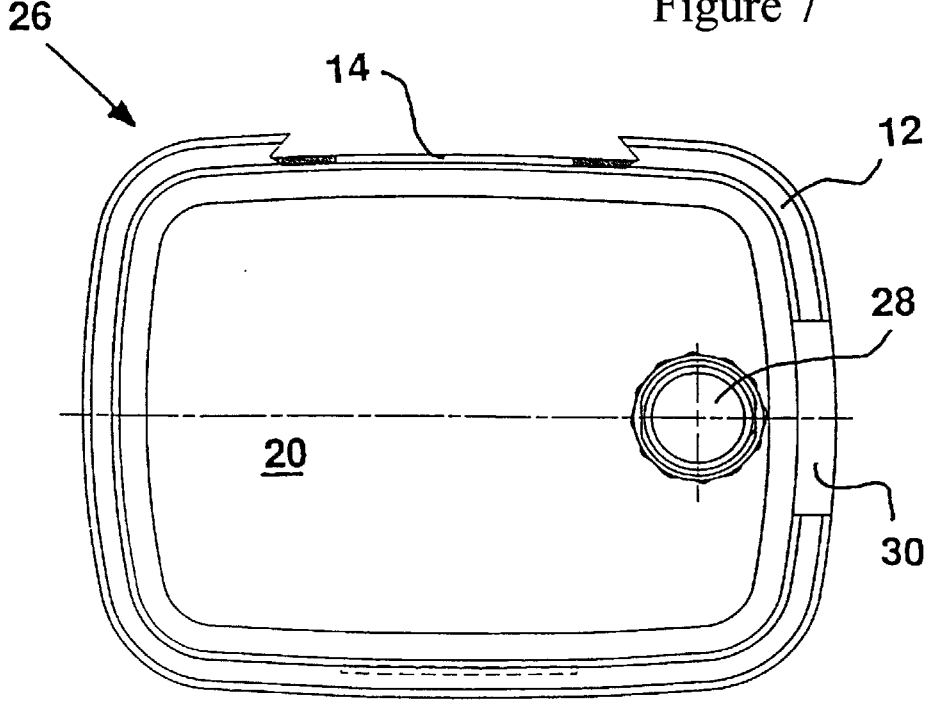
FIG. 8 is a top view of a rectangular-base reusable container.

FIG. 8 is a similar top view of a special design variant of the reusable container per this invention in the form of a canister 26 with an L-shaped upper stacking ring 12. The basic shape of this canister version 26 (L-ring jerrican) is essentially rectangular and the handle openings 14 are located opposite each other in the upper stacking ring 12 on the two long side walls while the filler and drain opening, closed off with the screw cap 28, is positioned at the outer perimeter of the top panel 20 next to one of the two short side walls in between. In this case, in contrast to the lower stacking ring, the upper stacking ring 12 is not completely continuous but is interrupted by a cutout 30 in front of the filler and drain opening to permit unimpeded pouring of the liquid content. Where a large filler and drain opening is located in the center, the upper stacking ring as well will be circumferentially continuous.

Figure 9:
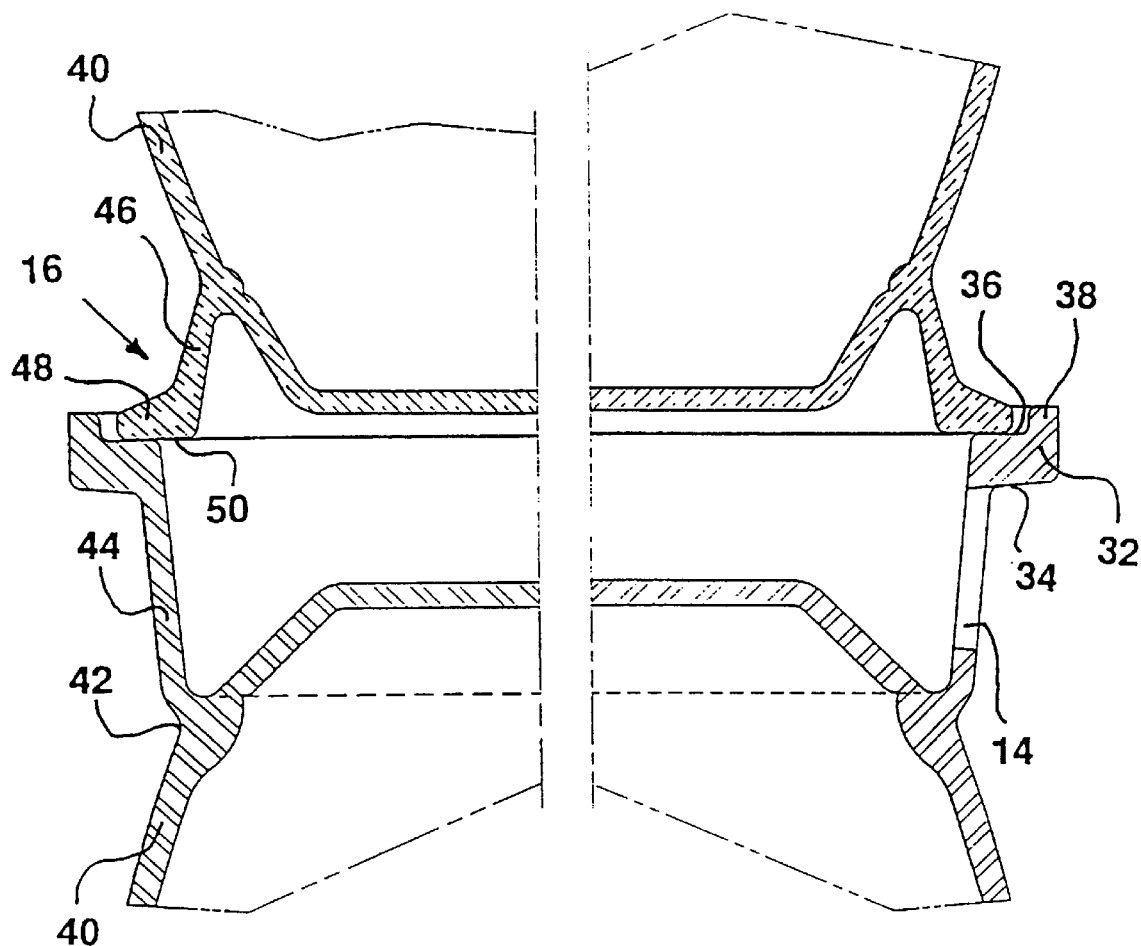
FIG. 9 is a partial, sectional side view of the top and bottom ends of two reusable containers stacked one atop the other.

FIG. 9 is a partial, sectional view of the corner areas of two containers one stacked atop the other. In this case, the upper container, with the horizontal contact surface 50 of the support ring 16 of the circular foot 48, facing downward, rests on the horizontal, upward-pointing contact surface 36 of the angled rim 32 of the upper stacking ring of the lower container. The circular flange 38 (centering ring) protruding vertically from the outside of the angled rim 32 centers the circular foot 48 of the stacked barrel, preventing any lateral slippage of the barrels or drums for instance due to vibration during transport. When the containers are stacked directly one atop the other, there is no axial load on the vertically protruding flange 38 ( no leverage).

Below the junction 42 of the collar 44 of the upper stacking ring, and again above the junction of the collar 46 of the lower support ring 16, the container wall 40 recedes at a slightly oblique angle or is rounded over a height from about 100 mm (4") to the cylindrical section of the drum body.

The largest angle of inclination in this case is about 15° to 20°. At the same time, the collar 44 of the upper stacking ring 12 (angle of inclination about 5° to 8°) and the collar 46 of the lower stabilizing ring 16 are slightly sloped toward the outside. For increased radial rigidity, the upper edge, i.e. the angled rim 32 of the upper stacking ring is relatively thick and solid. The bottom surface of the angled rim 32 of the upper stacking ring 12 constitutes a wide, essentially horizontal or perhaps slightly sloped contact surface 34 for the lower claw of a barrel loader. The upper claw of the barrel loader engages on the inside of the angled rim 32 which, being an extension of the collar 44, serves as a counter-support.

Figure 10:
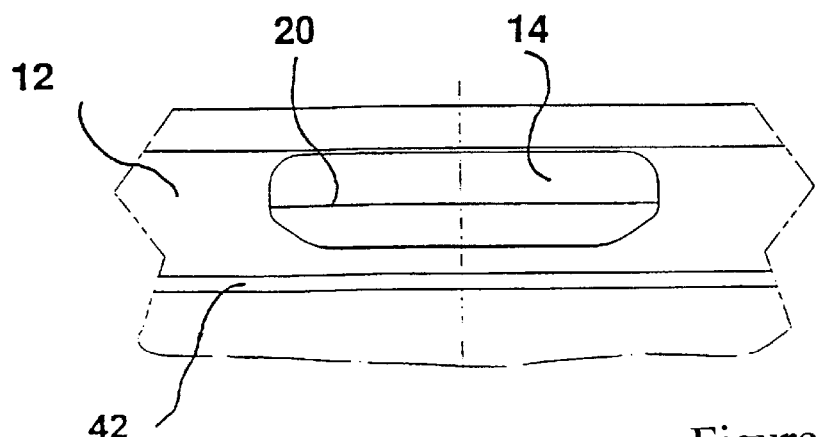
FIG. 10 shows part of the upper stacking ring with a handle opening.

The partial view in FIG. 10 shows a handle opening 14 in the stacking ring 12. According to the invention, the containers are preferably produced in one piece by a single-operation blow-molding process employing two header dies for shaping the two circumferential stacking rings while at the same time, still in the blow mold, two rotary punch dies punch out the handle openings in the upper stacking ring.

Figure 11:
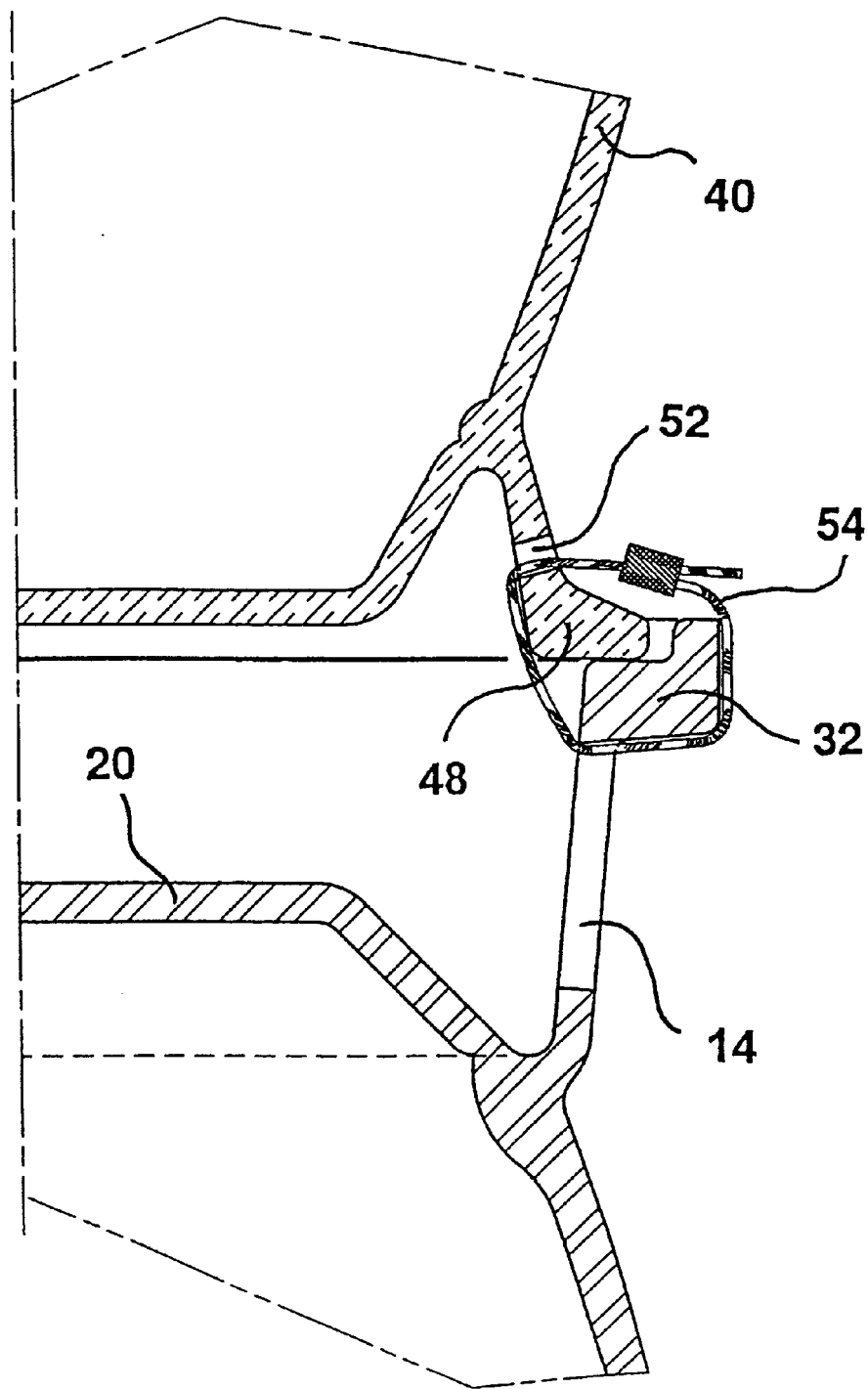
FIG. 11 is a partial, sectional side view of the top and bottom ends of two reusable containers stacked one atop the other and secured to one another.

FIG. 11 illustrates one possible way to secure the containers per this invention for transport purposes. The collar of the lower stabilizing ring, above the circular foot 48, is provided with several evenly spaced perforations 52. These may be for instance simple drill holes but may also be horizontal slots already molded in when the circular foot 48 is formed by heading during the blow-molding process. It is thus possible to run for instance a retaining wire or —as shown here—cable ties 54 through the perforations 52 and the handle opening 14, securely tying the two vertically stacked containers together. The containers are released by simply cutting the cable ties.

Figure 12:
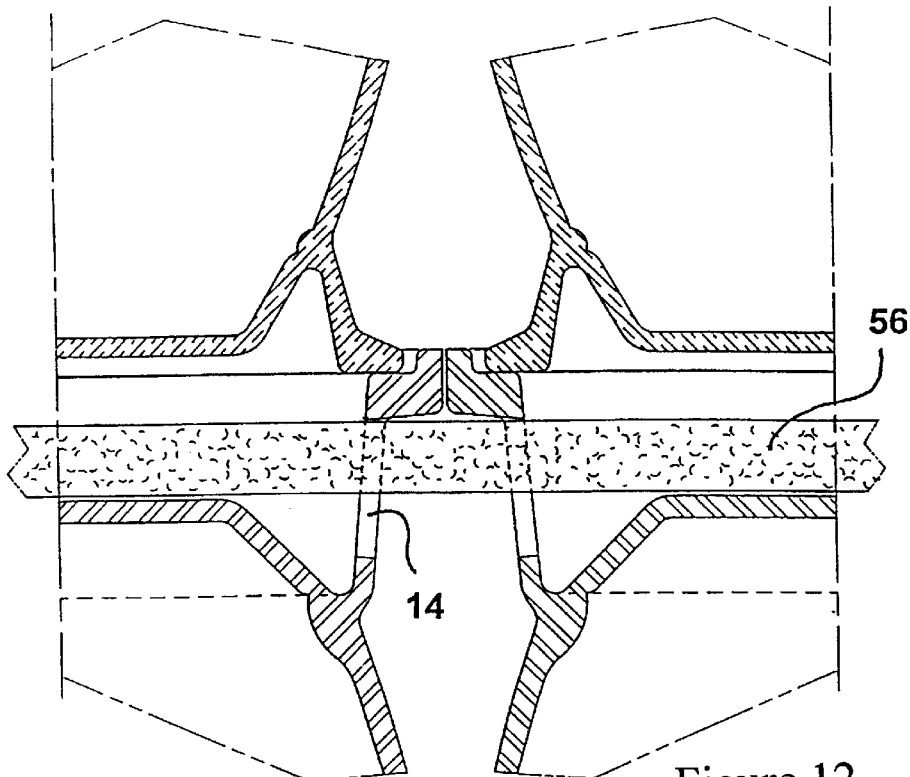
FIG. 12 is a partial, sectional side view of the top and bottom ends of two reusable containers stacked one atop the other and secured in a different manner.

FIG. 12 shows another possible way to secure the containers per this invention for transport purposes, whereby the handle openings are lined up and a wooden lath 56 is inserted to lock the containers together.

Figure 13:
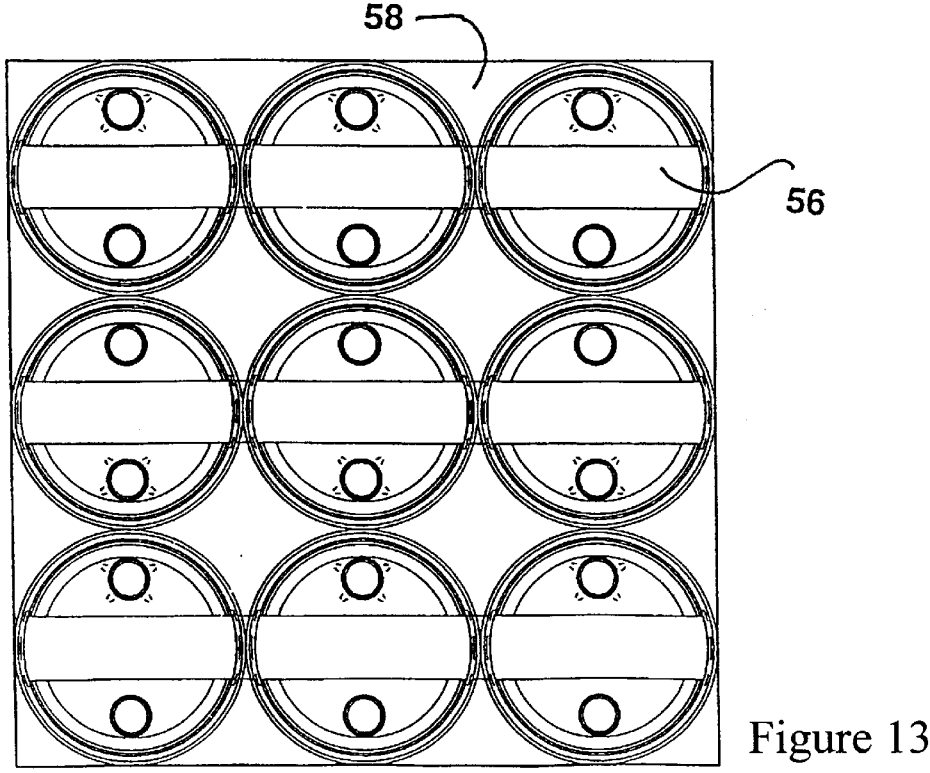
FIG. 13 is a top view of a pallet holding nine reusable containers.

FIG. 13 is a top view illustrating this fastening method applied to containers placed side by side on a base pallet 58.

Figure 14:
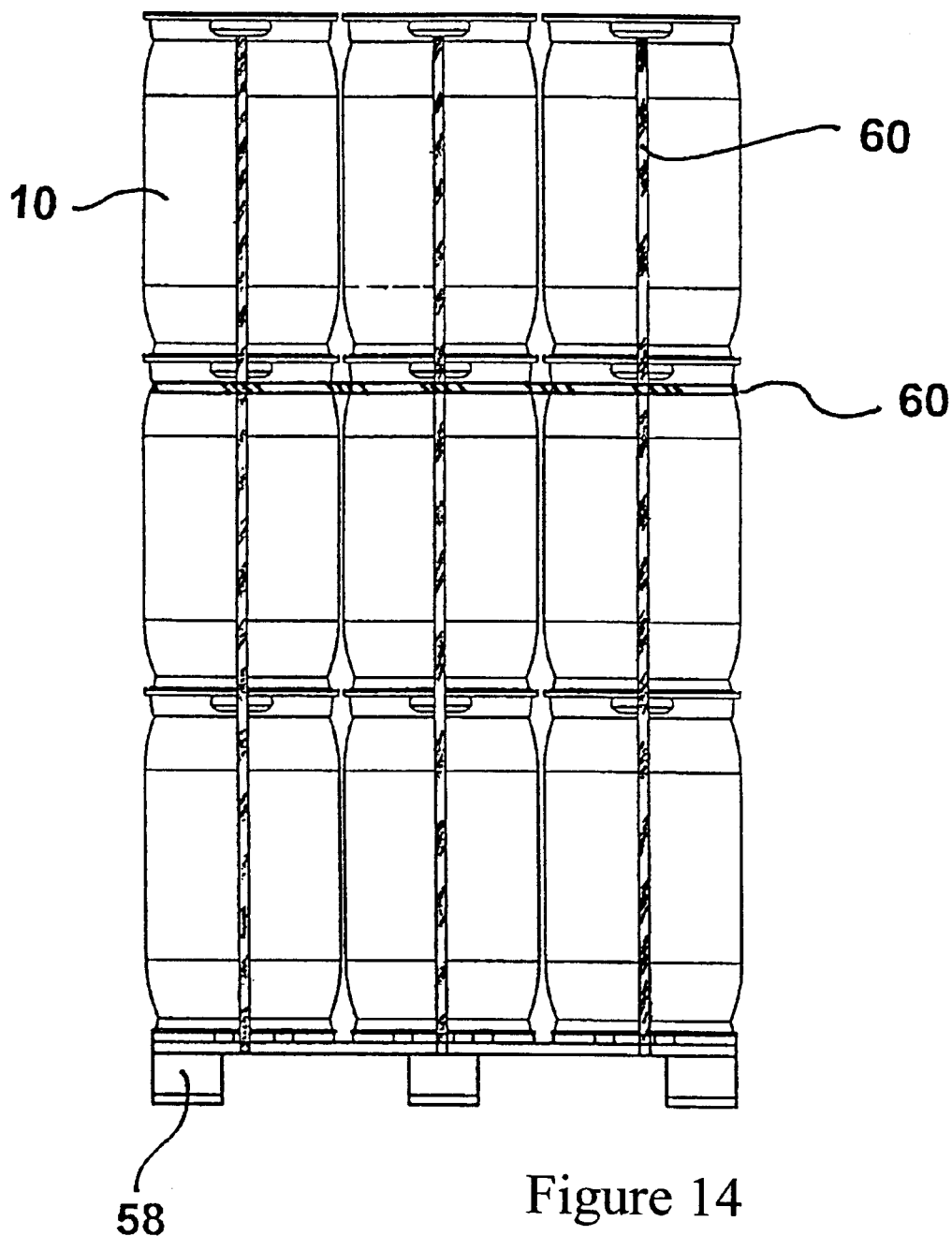
FIG. 14 is a side view of palletized reusable containers.

FIG. 14 depicts triple-tier direct stacking (i.e. without intermediate pallets) of 3×3×3=27 containers 10 stacked on a base pallet 58, in which case the containers are secured especially against vibration during transport for instance by clamping straps 60 run vertically through the handle openings in the upper stacking ring down to below the deck of the pallet and, respectively, wrapped horizontally around the containers and attached to the pallet 58 proper. When loading 60 liter containers per this invention (approx. diameter 380 mm [25"], approx. height 665 mm [26.18"]) into a 20-foot ISO container (DIN 668) accommodating 10 side-by-side ISO pallets (1140×1140 mm [45"×45"]), it is possible to load 9 containers in one plane of each ISO pallet which equals 27 containers when triple-stacked or 270 containers on 10 pallets, with a combined capacity of 16,200 liters (4,280 gallons).

Reusable containers according to this invention may have a container body with circular stacking and support rings yet with an essentially rectangular, square or hexagonal base.

Figure 15:
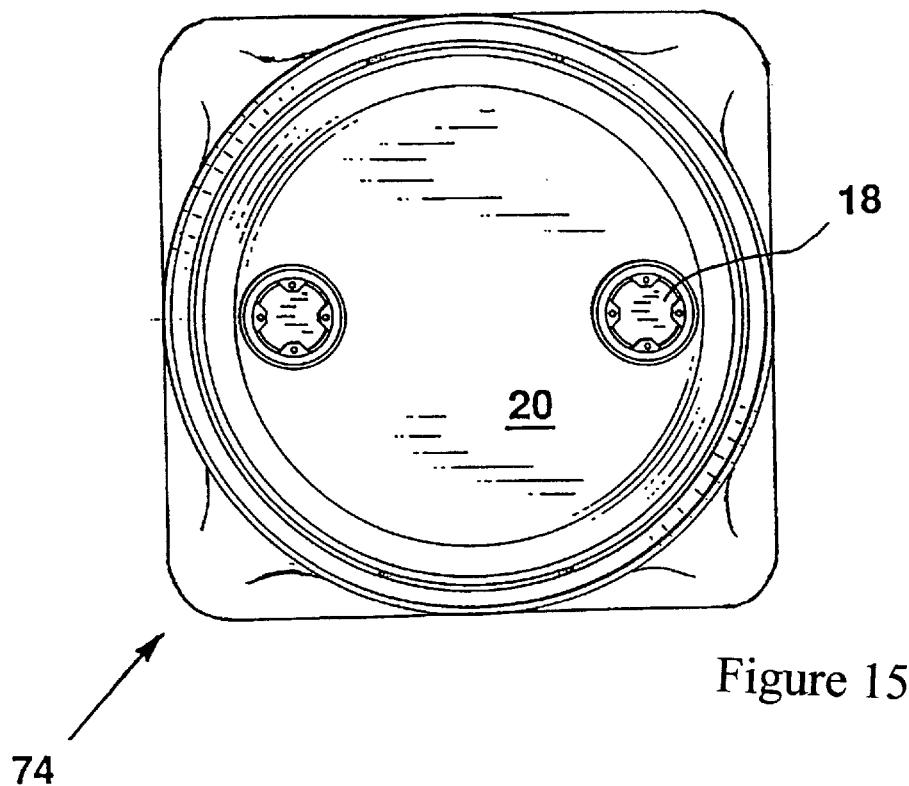
FIG. 15 is a top view of a container with a square base.
Figure 16:
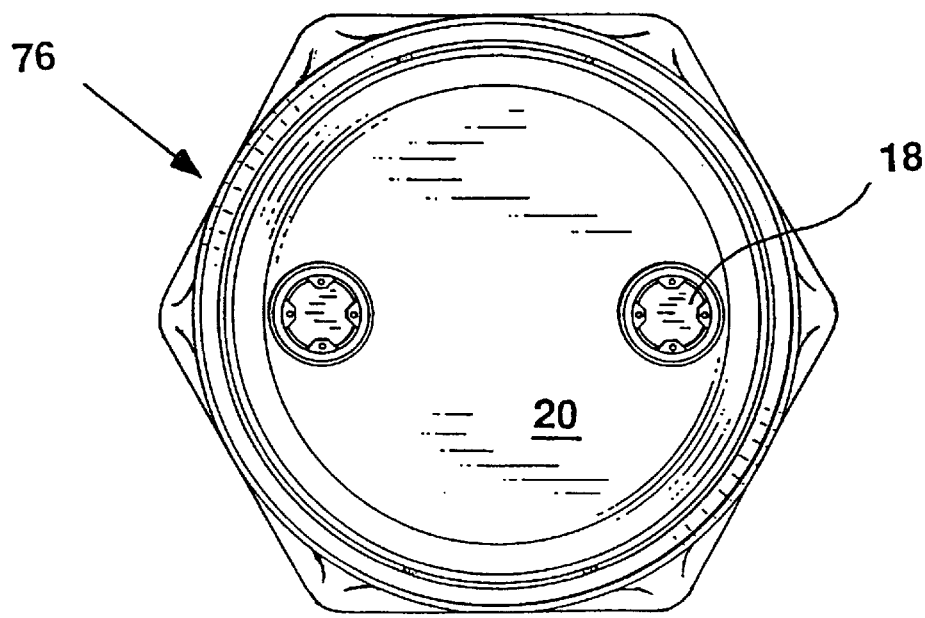
FIG. 16 is a top view of a container with a hexagonal base.

FIG. 15 and FIG. 16 respectively show a square-base container 74 and a hexagonal-base container 76. The rounded corners may also have a larger radius or curvature.

Figure 17:
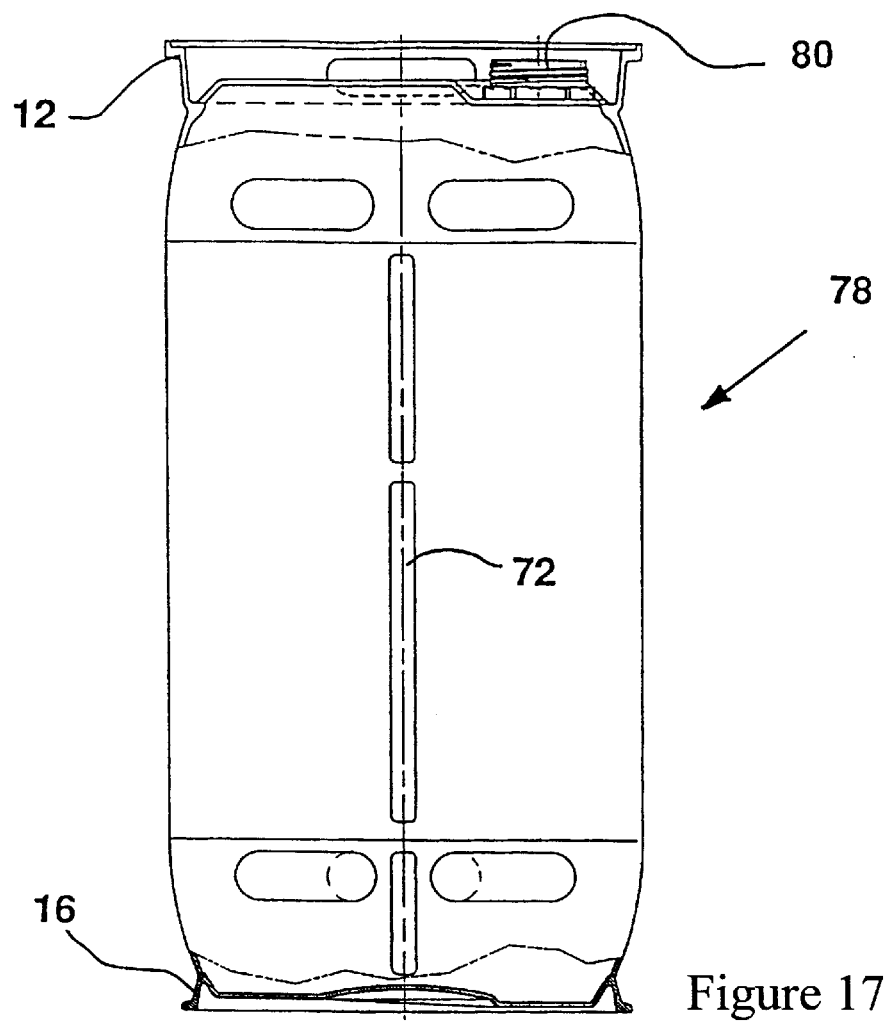
FIG. 17 is a side view of a 70 liter screw-cap-type container.

An extra-high container 78 with a capacity of about 70 liters (18.5 gallons) is depicted in FIG. 17. On one side of its top panel, this tall container 78 is provided with a filler and drain bung fitting 80 (diameter 80 mm [3.15"]) with an external thread for a K 80 screw cap. It is equally possible to position the fitting 80 in the center of the top panel.

Figure 18:
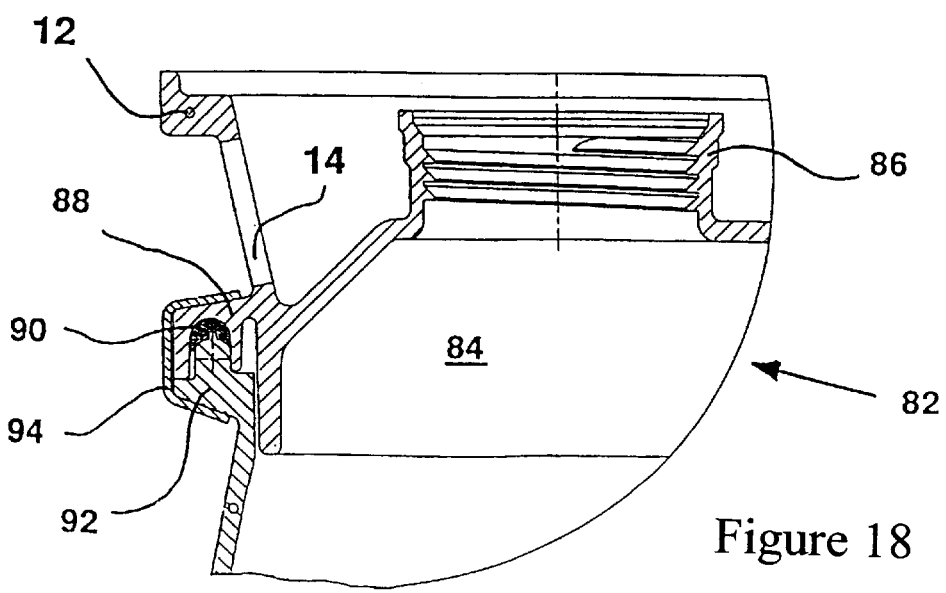
FIG. 18 is a partial, sectional view of the top end of a lidded container.

FIG. 18 shows a section of a special design version of a lidded container 82 according to this invention. In this case the detachable lid 84 is provided with a stacking ring 12 (and handle opening 14) and at least one lateral bung fitting 86. Underneath the stacking ring 12 the lid 84 has an inverted-U-shaped peripheral lid flange 88 with an inlaid gasket or foamed-in circular seal 90. The lid flange 88 rests on the lip of a wall flange 92 on the rim of the upper perimeter of the drum body. When closed, the lid flange 88 and the wall flange 92 are locked together in gas-tight and impermeable fashion by a clamping ring 94. This lidded drum 82 is particularly suitable for multiple reuse for holding viscous or granular substances.

For multiple reuse, appropriately sturdy containers can be produced in larger sizes as required, for instance with a capacity of 100, 120, 150, 200 or 220 liters (26.4, 31.7, 39.6, 52.8 or 58.1 gallons). However, when filled, these containers can no longer be handled manually but must be manipulated preferably with the aid of mobile elevating platforms or forklifts with the necessary drum-loading equipment ('parrot beak'). The features described may be easily substituted for one another and/or used in any combination.

LIST OF REFERENCE NUMBERS

10 reusable container
12 stacking ring
14 Handle opening container
16 Support ring
18 Bung
20 Top panel
22 Screw-lid-type small drum
24 Screw-on lid
26 L-ring canister
28 Screw cap
30 Cutout (12)
32 Angled rim (12)
34 Lower contact surface for barrel loader
36 Horizontal contact surface (32)
38 Centering ring (32)
40 Container wall (10/22/26)
42 Junction (12/40)
44 Collar (12)
46 Collar (16)
48 Circular foot (46)
50 Contact surface (48)
52 Perforation (bore)
54 Fastening aid/cable tie
56 Fastening aid (board, lath)
58 Pallet
60 Clamping straps
62 Pump tube
64 Bottom panel
66 Sump
68 Centering lugs
70 Circular adapter section
72 Level-viewing strip
74 Rectangular-base
76 Hexagonal-base container
78 Tall container
80 Filler/drain fitting
82 Lidded barrrel
84 Barrel/drum lid
86 Bung fitting
88 Lid flange
90 Seal/gasket
92 Wall flange
94 Clamping ring

What is claimed is:

1. A container, made of a thermoplastic material, with at least one filler opening in the top panel or container lid and with a center section and an upper and a lower circumferential stacking ring, wherein the upper stacking ring has a slightly larger diameter than the lower stacking ring, the upper stacking ring is provided on the inside of its upper rim with a recess which matches the diameter of the lower stacking ring, and on its outside with a vertically protruding circular flange so that, when stacked one container atop the other, the lower stacking ring of the upper container fits into the recess in the upper stacking ring of the container underneath and is snugly centered by the vertically protruding circular flange.

2. Container as in claim 1, wherein the upper stacking ring includes a collar with an upper end defining an upper rim which has a solid, square cross section and from the outside of which the circular flange protrudes vertically in the axial direction.

3. Container as in claim 1 wherein the collar of the upper stacking ring extends upwardly and is slightly flared toward the outside.

4. Container as in claim 1, wherein the collar of the upper stacking ring extends upwardly and is provided with two mutually opposite handle openings.

5. Container as in claim 1, wherein the center section of the container is fully cylindrical over a certain axial length while slightly rounded or tapered toward respective top and bottom junctions with the upper and lower stacking ring.

6. Container as in claim 5, wherein the height of the rounded, tapered section of the container from the junction respectively with the upper and lower stacking ring to the point where the container wall becomes fully cylindrical is approximately 110 mm (4.33").

7. Container as in claim 5, wherein for a container with a limited capacity of not more than 70 liters (18.5 gallons), the maximum diameter in the area of the fully cylindrical container wall or of the outer edge of the upper stacking ring is about 380 mm (15").

8. Container as in claim 1, wherein the top panel is essentially flat or slightly convex and is provided near the perimeter with two diametrically opposite, protruding bung fittings with gas-tight-sealable bung holes.

9. Container as in claim 1, wherein the top panel is essentially flat and connects to a tapered lower container wall section by way of a flared or cambered circular adapter section at the junction of the upper stacking ring.

10. Container as in claim 1, wherein the container has bottom panel which is slightly sloped toward one side, thus forming a depression, constituting a sump underneath a bung fitting.

11. Container as in claim 10, wherein the bottom panel is provided in the area of the sump with at least three inward-pointing protrusions serving to center a bottom end of a pump tube.

12. Container as in claim 10, wherein for facilitated residual drainage a center area of the bottom panel is slightly domed or convex.

13. Container as in claim 1, wherein for facilitated residual drainage of the inverted container the center area of the top panel between two bung fittings is slightly curved inward or concave.

14. Container as in claim 1, wherein the container is a multi-layered wall structure, consisting of at least two different thermoplastic materials (co-extrusion).

15. Container as in claim 1, wherein the top panel is provided in its center with a protruding, internally threaded bung fitting with a 2-inch or 3-inch bung hole, permitting gas-tight and impermeable sealing by means of a bung with an external thread.

16. Container as in claim 1, wherein the top panel is provided in its center with a protruding, externally threaded bung fitting with a bung-hole diameter equal to or larger than 80 mm (3.15"), permitting gas-tight and impermeable sealing by means of a screw cap with an internal thread.

17. Container as in claim 1, wherein the thermoplastic material is transparent or, if it is of an opaque color, a level-viewing strip is incorporated and the container is provided with a molded-in fill-level scale.

18. Container as in claim 1, wherein the lower stacking ring (16) includes a collar (46), above an angled circular foot (48), which is provided with at least one perforation (52) through which a fastening aid (54) can be inserted to allow the fastening of the lower stacking ring (16) of a stacked container to the upper stacking ring (12) of the container underneath.

19. Container as in claim 18, wherein at least two side-by-side containers are lined up in such fashion that their handle openings (14) are aligned, permitting a length of a fastening aid (56) to be inserted through the handle openings (14) for securing the containers to one another.

20. Container as in claim 1, wherein for enhanced stacking stability during storage and transport, several containers stacked on a pallet (58) can be secured to one another and/or to the pallet (58) itself by inserting fastening aids (54, 56, 60) through handle openings (14) provided in the upper stacking ring (12) and/or through perforations (52) in the lower stacking ring (16).

21. Blow mold for producing a reusable container from a thermoplastic material by the blow-mold process, wherein a specially configured cavity for producing a reusable container that is provided with at least one filler and drain opening in the top panel or container lid and with an upper and a lower circumferential stacking ring, where the upper stacking ring is of a slightly larger diameter than the lower stacking ring and the upper stacking ring is provided on the inside of an upper rim with a recess which matches the diameter of the lower stacking ring and on its outside with a vertically protruding circular flange so that, when containers are stacked one atop the other, the lower stacking ring of the upper container fits into the recess of the upper stacking ring of the container underneath and is snugly centered by the vertically protruding circular flange surrounding it.

22. Blow mold as in claim 21, wherein each of two parts of the blow mold is provided with an attachment by means of which the handle openings in the upper stacking ring are punched out.

23. Blow mold as in claim 21, wherein a fully cylindrical part of the blow mold is horizontally separated for the center section of the container and can be easily exchanged, so that by appropriate interchanging of ring sections it is possible to produce a variety of containers, all of the same diameter but different in height, for the preferred capacities of 25, 30, 50, 60 or 70 liters.

* * * * *